(12) United States Patent
Yabuki

(10) Patent No.: US 7,752,498 B2
(45) Date of Patent: Jul. 6, 2010

(54) INFORMATION PROCESSING DEVICE, INTERFACE CONTROLLER INITIALIZING METHOD AND PROGRAM

(75) Inventor: Tomoyasu Yabuki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 474 days.

(21) Appl. No.: 11/902,997

(22) Filed: Sep. 27, 2007

(65) Prior Publication Data

US 2008/0077725 A1 Mar. 27, 2008

(30) Foreign Application Priority Data

Sep. 27, 2006 (JP) ............................. 2006-262069

(51) Int. Cl.
*G06F 11/00* (2006.01)
(52) U.S. Cl. .............................. 714/24; 714/23; 714/49
(58) Field of Classification Search .................. 714/23, 714/24, 49, 51; 710/10, 313; 713/1
See application file for complete search history.

(56) References Cited

U.S. PATENT DOCUMENTS

| 6,189,050 B1* | 2/2001 | Sakarda ........................ 710/18 |
| 6,434,703 B1* | 8/2002 | Parrish et al. ................ 713/310 |
| 2005/0045720 A1* | 3/2005 | Fruhauf ....................... 235/440 |
| 2007/0023499 A1* | 2/2007 | Wurzburg et al. ........... 235/376 |

* cited by examiner

*Primary Examiner*—Joshua A Lohn
(74) *Attorney, Agent, or Firm*—Scully, Scott, Murphy & Presser, P.C.

(57) ABSTRACT

An interface controller initializing method for an information processing device equipped with multiple interfaces of the same type comprises the steps of: detecting control of an interface executed by a first control unit; detecting an end of the control of the interface by the first control unit executed according to instructions regarding the control of the interfaces issued by a second control unit; detecting abnormality regarding the control of an interface by the first control unit; allowing a user to input an initialization instruction for initialization of the first control unit; and executing the initialization of the first control unit on condition that the abnormality regarding the control of an interface by the first control unit has been detected, the initialization instruction has been inputted, and the end of the control of at least one of the other interfaces by the first control unit has been detected.

13 Claims, 7 Drawing Sheets

INFORMATION PROCESSING DEVICE, INTERFACE CONTROLLER INITIALIZING METHOD AND PROGRAM

CROSS REFERENCE TO RELATED APPLICATION

This application claims priority from Japanese Patent Application No. 2006-262069, filed on Sep. 27, 2006, the entire subject matter of which is incorporated herein by reference.

BACKGROUND OF THE INVENTION

1. Field of the Invention

The present invention relates to an information processing device equipped with multiple interfaces of the same type which can be connected with external devices.

2. Related Art

Various types of information processing devices equipped with an interface (enabling connection with external devices under the control of a prescribed program) so as to implement functions other than the original functions of the information processing device have been proposed so far. For example, an image processing device equipped with a USB (Universal Serial Bus) terminal has been proposed in Japanese Patent Provisional Publication No. P2005-110086A.

Some of such information processing devices are equipped with two or more interfaces of the same type (e.g. USB terminals).

The user of such an information processing device equipped with multiple interfaces of the same type can use multiple external devices with the information processing device, by connecting the external devices to the interfaces of the information processing device. In such cases, the program controlling the interfaces (e.g. USB host driver) can sometimes need to be initialized when abnormality has occurred to the program due to the use of another external device during the use of an external device, for example.

SUMMARY OF THE INVENTION

In the above case, if the initialization is executed without taking usage of an external device (first external device) when an initialization of a program becomes necessary due to usage of another external device (second external device), the execution of the initialization may affect the usage of the second external device.

The present invention which has been made in consideration of the above problems is advantageous in that an information processing device, an interface controller initializing method and a computer-readable record medium storing computer-readable instructions, capable of carrying out the initialization of the program controlling the multiple interfaces in parallel with substantially no ill effects on processing between the information processing device and an external device connected to the information processing device via one of the interfaces, can be provided.

In accordance with an aspect of the present invention, there is provided an information processing device equipped with multiple interfaces of the same type which can be connected with external devices, comprising: a first control unit capable of controlling the multiple interfaces in parallel; a second control unit which issues instructions regarding control of the interfaces to the first control unit; an execution detecting unit which detects the control of an interface executed by the first control unit; an end detecting unit which detects an end of the control of an interface by the first control unit executed according to the instructions regarding the control issued by the second control unit, on condition that the control of the interface by the first control unit has been detected by the execution detecting unit; an abnormality detecting unit which detects abnormality regarding the control of an interface by the first control unit; an initialization unit which executes initialization of the first control unit; an input unit through which an initialization instruction for the initialization of the first control unit is inputted; and an initialization control unit which executes the initialization of the first control unit by use of the initialization unit on condition that the abnormality regarding the control of an interface by the first control unit has been detected by the abnormality detecting unit, the initialization instruction has been inputted through the input unit, and the end of the control of at least one of the other interfaces by the first control unit has been detected by the end detecting unit.

With the information processing device configured as above, the initialization of the first control unit (capable of controlling the multiple interfaces in parallel) can be carried out with substantially no ill effects on processing between the information processing device and at lease one external device connected to the information processing device via at lease one of the interfaces.

In accordance with another aspect of the present invention, there is provided a computer-readable record medium storing computer-readable instructions that cause a computer, which controls an information processing device equipped with multiple interfaces of the same type which can be connected with external devices, to execute: an execution detecting step of detecting control of an interface executed by a first control unit capable of controlling the multiple interfaces in parallel; an end detecting step of detecting an end of the control of an interface by the first control unit executed according to instructions regarding the control of the interfaces issued by a second control unit, on condition that the control of the interface by the first control unit has been detected by the execution detecting step; an abnormality detecting step of detecting abnormality regarding the control of an interface by the first control unit; an input step of allowing a user to input an initialization instruction for initialization of the first control unit; and an initialization control step of executing the initialization of the first control unit on condition that the abnormality regarding the control of an interface by the first control unit has been detected by the abnormality detecting step, the initialization instruction has been inputted in the input step, and the end of the control of at least one of the other interfaces by the first control unit has been detected by the end detecting step.

With the computer-readable record media configured as above, effects similar to those of the information processing device described above can be achieved.

In accordance with another aspect of the present invention, there is provided an interface controller initializing method for an information processing device equipped with multiple interfaces of the same type which can be connected with external devices, comprising: an execution detecting step of detecting control of an interface executed by a first control unit capable of controlling the multiple interfaces in parallel; an end detecting step of detecting an end of the control of an interface by the first control unit executed according to instructions regarding the control of the interfaces issued by a second control unit, on condition that the control of the interface by the first control unit has been detected by the execution detecting step; an abnormality detecting step of detecting abnormality regarding the control of an interface by the first control unit; an input step of allowing a user to input an initialization instruction for initialization of the first control unit; and an initialization control step of executing the initialization of the first control unit on condition that the abnormality regarding the control of an interface by the first control unit has been detected by the abnormality detecting step, the initialization instruction has been inputted in the input step, and the end of the control of at least one of the other interfaces by the first control unit has been detected by the end detecting step.

With the interface controller initializing method configured as above, effects similar to those of the information processing device described above can be achieved.

BRIEF DESCRIPTION OF THE ACCOMPANYING DRAWINGS

DETAILED DESCRIPTION OF THE EMBODIMENT

Figure 1:
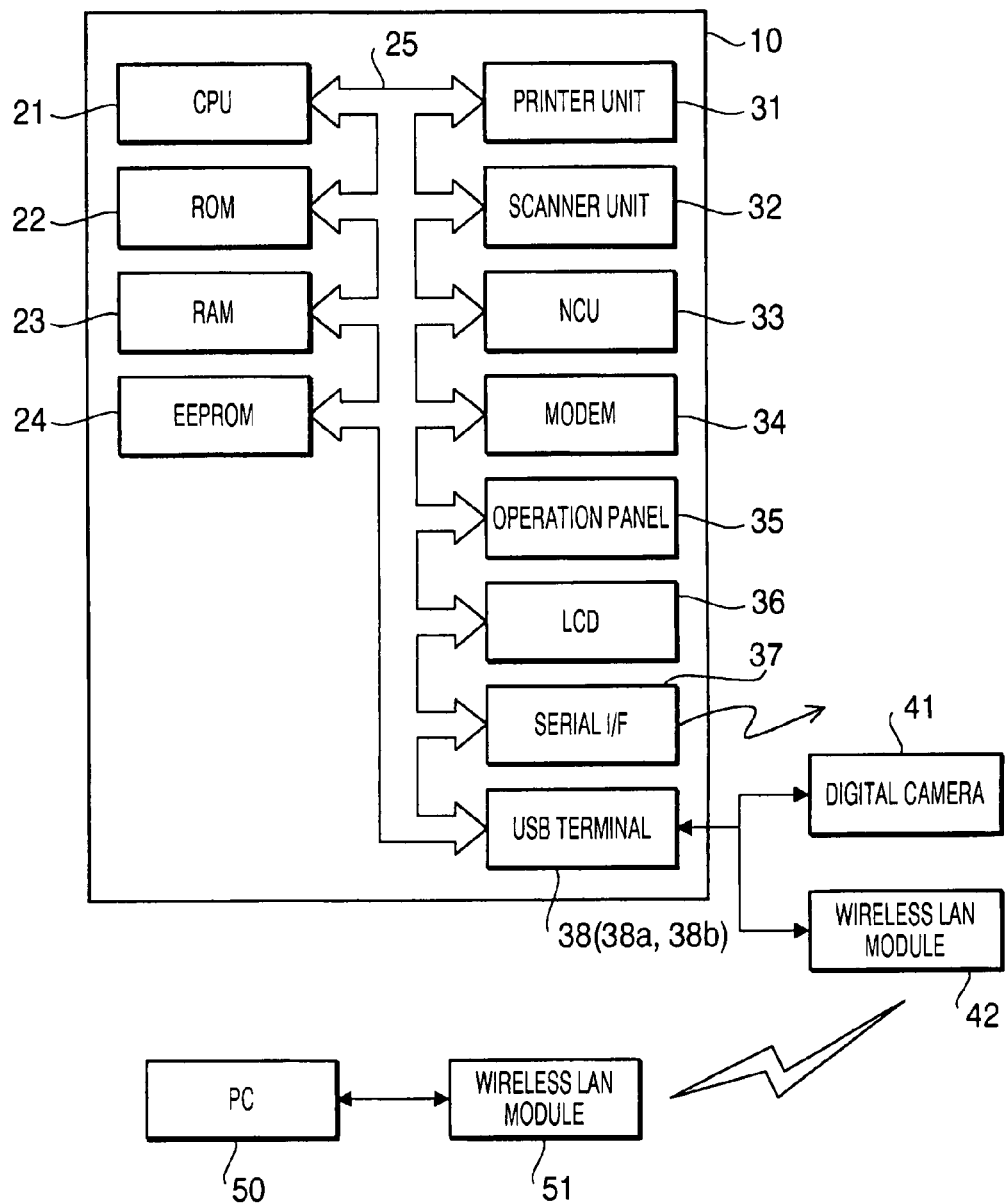
FIG. 1 is a block diagram showing the configuration of an MFP (Multi-Function Peripheral) as an information processing device in accordance with an embodiment of the present invention.

Further, since continuation of the abnormal state of the first control unit can be avoided properly, the processing efficiency of the information processing device can be increased.

Referring now to the drawings, a description will be given in detail of a preferred embodiment in accordance with the present invention.

FIG. 1 is a block diagram showing the configuration of an MFP (Multi-Function Peripheral) 10 as an information processing device in accordance with an embodiment of the present invention. As shown in FIG. 1, the MFP 10 of this embodiment includes a CPU (Central Processing Unit) 21, a ROM (Read Only Memory) 22, a RAM (Random Access Memory) 23 and an EEPROM (Electrically Erasable Programmable ROM) 24 which are connected to a bus 25. Also connected to the bus 25 are a printer unit 31, a scanner unit 32, an NCU (network control unit) 33, a modem 34, an operation panel 35, an LCD (Liquid Crystal Display) 36, a serial I/F 37, USB (Universal Serial Bus) terminals 38, etc.

The CPU 21, as the central processing unit of the MFP 10, is capable of executing various computations. Programs for the operation of the MFP 10 are executed by the CPU 21.

The ROM 22, the RAM 23 and the EEPROM 24 are storage units for storing various programs (operating system, etc.) and data necessary for the operation of the MFP 10. Each of the storage units is used for proper storage purposes depending on its properties (read only, rewritable, nonvolatile, etc.).

The printer unit 31 is a unit for printing data. The printer unit 31 in this embodiment is configured as an ink-jet printing unit capable of printing data on a print medium (paper, etc.) by discharging ink. The printing method employed by the printer unit 31 is not restricted to ink-jet printing; other methods like laser printing, thermal transfer printing, etc. may also be employed.

The scanner unit 32 is a unit capable of scanning images, characters, etc. on a sheet (paper, etc.) and thereby generating image data.

The NCU 33 and the modem 34 are units for the communication with other devices. Via the NCU 33 and the modem 34 which are connected to a network, telephone circuit, etc., the MFP 10 can transmit and receive data such as FAX data.

The operation panel 35, as an operation unit allowing the user to input various instructions to the MFP 10, includes a plurality of buttons. In this embodiment, the operation panel 35 includes a refresh button R to be pressed for inputting an initialization instruction (explained later).

The LCD (Liquid Crystal Display) 36 is a unit for displaying a variety of information. The LCD 36 may be configured to function also as a touch panel, to serve as a part of the operation unit.

The serial I/F (interface) 37 is a unit for connection, transferring data in units of bits. While a serial I/F is typically designed according to RS-232C, USB, IEEE1394, etc., the serial I/F 37 in this embodiment is assumed not to include a USB terminal for convenience of explanation.

The USB terminals 38 (e.g. USB ports), as connection units in conformity with the USB (Universal Serial Bus) standard, function as interfaces of the MFP 10 to which USB devices as external devices can be connected. While the MFP 10 can actually be equipped with several USB terminals 38, the MFP 10 in this embodiment is assumed to have two USB terminals 38 (first USB terminal 38a, second USB terminal 38b) for convenience of explanation.

In this embodiment, a digital camera 41 and a wireless LAN module 42 are connected to the USB terminals 38 of the MFP 10 as shown in FIG. 1.

The digital camera 41 in this embodiment is a digital still camera in conformity with the technical standard CIPA DC-001 (hereinafter referred to as "PictBridge standard"). Pictures (image data) stored in the digital camera 41 can be printed out by the MFP 10 with ease according to the PictBridge standard, by connecting the digital camera 41 to the MFP 10 via the USB terminal 38.

The wireless LAN module 42 is a LAN module capable of executing wireless communication according to a wireless communication method in conformity with IEEE802.11b, etc. by use of a wireless transmission channel (without using a transmission cable).

By connecting the digital camera 41 (as an external devices) to the first USB terminal 38a of the MFP 10, the printing of image data (pictures, etc.) stored in the digital camera 41 becomes possible. Meanwhile, by connecting the wireless LAN module 42 (as an external devices) to the second USB terminal 38b of the MFP 10, communication between the MFP 10 and a PC (Personal Computer) 50 becomes possible via the wireless LAN module 42 and another wireless LAN module 51 connected to the PC 50. For example, image data transmitted from the PC 50 is printed out by the printer unit 31 of the MFP 10 when an instruction for a printing process is transmitted from the PC 50 via the PC-side wireless LAN module 51.

While the MFP 10 in this embodiment is assumed to have a plurality of (two) USB terminals 38, it is possible to connect a plurality of external devices to the MFP 10 even when the MFP 10 has only one USB terminal 38, by connecting a hub device (functioning as nodes) to the USB terminal 38 functioning as a host. The external devices (digital camera 41, wireless LAN module 42) connected to the USB terminal 38 can either be bus-powered devices or self-powered devices.

In this embodiment, the digital camera 41 and the wireless LAN module 42 are assumed to be connected to the first USB terminal 38a and the second USB terminal 38b, respectively for convenience of explanation even though this embodiment achieves the same effects even when the digital camera 41 and the wireless LAN module 42 are connected to the second USB terminal 38b and the first USB terminal 38a, respectively.

In the ROM 22 of the MFP 10, a USB host driver (as a first control unit) for controlling the USB terminals 38 has been prepared, to be used by programs operating on the CPU 21. The USB host driver is capable of controlling the connection status of the digital camera 41 and the wireless LAN module 42 connected to the USB terminals 38, by use of an unshown host controller.

By the control by the USB host driver, the digital camera 41 and the wireless LAN module 42 connected to the USB terminals 38 by the USB connection can be used on the MFP 10 simultaneously. Even though transmission/reception of only one piece of data can be controlled at a time (since only one USB host driver is prepared in general), the digital camera 41 and the wireless LAN module 42 are controlled as if they were connected to the MFP 10 via multiple communication lines and operating in parallel, by means of time sharing.

However, in order to use the functions of the digital camera 41 by connecting it to the MFP 10, an application for the digital camera 41 is necessary. Similarly, in order to use the functions of the wireless LAN module 42 by connecting it to the MFP 10, an application for the wireless LAN module 42 is necessary. In this embodiment, the application for the digital camera 41 will be referred to as a "first upper-level application A1", and the application for the wireless LAN module 42 will be referred to as a "second upper-level application A2". These applications A1 and A2 (as a second control unit) have been stored in the ROM 22.

In the following, the operation of the MFP 10 of this embodiment configured as above will be described in detail referring to flow charts of FIGS. 2-7.

Figure 2:
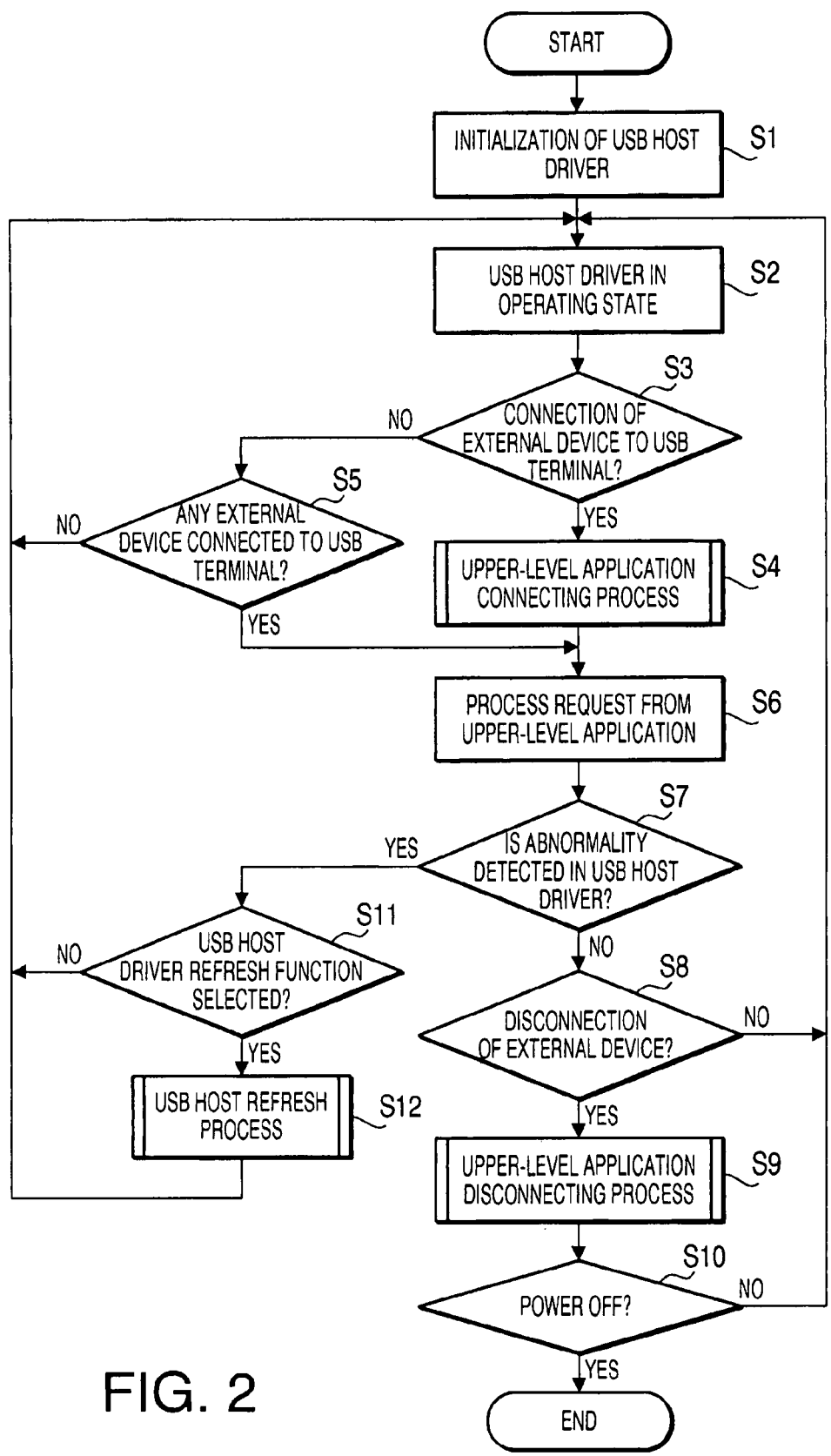
FIG. 2 is a flow chart showing a process (main routine) which is executed by the CPU of the MFP for using devices connected to USB terminals of the MFP.

FIG. 2 is a flow chart showing a process (main routine) which is executed by the MFP 10 (CPU 21) of this embodiment for using external devices connected to the USB terminals 38. The process of FIG. 2 (main routine) is started when the power of the MFP 10 is turned ON.

In step S1, the CPU 21 initializes the USB host driver, by which the USB host driver shifts to its operating state (becomes available) (S2).

In the next step S3, the CPU 21 judges (monitors) whether an external device has been connected to the USB terminal 38 or not. In this embodiment, two external devices (digital camera 41, wireless LAN module 42) are assumed to be connected to the USB terminals 38. These external devices may either be connected to the USB terminals 38 before or after the startup (i.e. turning ON of the power) of the MFP 10. In cases where the digital camera 41 and the wireless LAN module 42 have already been connected to the USB terminals 38 at the startup of the MFP 10, a connection process is executed for each of the external devices after the USB host driver has shifted to the operating state in S2. On the other hand, in cases where an external device (the digital camera 41 or the wireless LAN module 42) is connected to the USB terminal 38 after the startup of the MFP 10, the USB host driver executes the connection process at the point when the external device is connected to the USB terminal 38.

Therefore, the CPU 21 in the step S3 judges whether or not a new external device (digital camera 41, wireless LAN module 42) has been connected to the USB terminal 38 since the startup of the MFP 10. If a new external device has been connected to the USB terminal 38 (S3: YES), the process advances to step S4, otherwise (S3: NO) the process advances to step S5. Incidentally, in response to the connection of the external device (digital camera 41, wireless LAN module 42) to the USB terminal 38, the USB host driver carries out the setting of endpoints, the connection of pipes, and the configuration by use of the control transfer.

In the step S4, the CPU 21 executes an upper-level application connecting process as a subroutine for the connection to an upper-level application. The details of the upper-level application connecting process will be described later. After the step S4 is finished, the process advances to step S6.

In the step S5, the CPU 21 judges whether there exists an external device already connected to the USB terminal 38 or not. When there exists no external device connected to the USB terminal 38 (S5: NO), the process returns to the step S2. When there exists an external device already connected to the USB terminal 38 (S5: YES), the process advances to the step S6. Incidentally, in this case where an external device (e.g. digital camera 41) had already been connected to the USB terminal 38 at the startup of the MFP 10 (S3: N0, S5: YES), a process identical with the step S4 has already been executed for the external device previously to the step S5.

In the step S6, the CPU 21 processes a request from an upper-level application. For example, from the digital camera 41 connected to the first USB terminal 38a, an instruction requesting the printing of data stored in the digital camera 41 can be issued according to the PictBridge specifications. In this case, the MFP 10 executes the printing of the data stored in the digital camera 41 according to a request from the first upper-level application A1 receiving the instruction. Meanwhile, from the wireless LAN module 42 connected to the second upper-level application A2, a print instruction transmitted from the PC 50 via the PC-side wireless LAN module 51 can be issued. In this case, the MFP 10 prints out data received by the wireless LAN module 42 according to a request from the second upper-level application A2 receiving the print instruction. As above, a request from an upper-level application (receiving an instruction from an external device connected to the USB terminal 38) is processed in the step S6. Thereafter, the process advances to step S7. Incidentally, each upper-level application (first upper-level application A1, second upper-level application A2) uses the corresponding external device (digital camera 41, wireless LAN module 42) by issuing instructions to the USB host driver, without directly controlling the USB connection.

In the step S7, the CPU 21 checks whether abnormality has been detected in the USB host driver or not. The "abnormality detected in the USB host driver" is assumed to be abnormality in the connection status with the digital camera 41 or the wireless LAN module 42 connected to the USB terminal 38, such as a case where the communication between the MFP 10 and the digital camera 41 or the wireless LAN module 42 connected to the USB terminal 38 has become impossible due to an error. However, physical failures of the digital camera 41 and the wireless LAN module 42 are not included in the abnormality detected in the USB host driver. The "abnormality detected in the USB host driver" is restricted to abnormality that can be eliminated (functions can be restored to normal states) when the MFP 10 is shut down and restarted.

When such abnormality is detected (S7: YES), the process advances to step S11, otherwise (S7: NO) the process advances to step S8. The step S7 may also be configured to let the user know the detection of abnormality by displaying a warning message on the LCD 36, for example.

In the step S8, the CPU 21 judges whether the connection (connected state) of the USB terminal 38 with an external device (the digital camera 41 or the wireless LAN module 42) has been canceled or not. In this step, the connection status of each USB terminal 38 is monitored to find physical disconnection of an external device from the USB terminal 38. Since the digital camera 41 and the wireless LAN module 42 connected to the USB terminals 38 are devices supporting the plug-and-play function, such an external device can be removed from the USB terminal 38 before the shutdown (i.e. turning OFF of the power) of the MFP 10. This kind of events are monitored for in the step S8.

The aforementioned "physical disconnection" means that an external device (digital camera 41, wireless LAN module 42) is physically disconnected from the USB terminal 38 by pulling out the external device (or a connector connected to the external device) from the USB terminal 38. Since a USB cable functions also as a power supply line in the USB standard, it is possible to constantly monitor the connection status and detect the physical disconnection instantly.

When an external device has been disconnected (S8: YES), the process advances to step S9. When no external device has been disconnected (S8: NO) the process returns to the step S2.

In the step S9, the CPU 21 executes an upper-level application disconnecting process as a subroutine for disconnecting the connection with an upper-level application. The details of the upper-level application disconnecting process will be described later. After the step S9 is finished, the process advances to step S10.

In the step S10, when the power of the MFP 10 has been turned OFF (S10:YES), the process of FIG. 2 is ended. When the power has not been turned OFF (S10: NO), the process returns to the step S2 to repeat the same routine.

In the step S11, the CPU 21 judges whether a "USB host driver refresh function" has been selected or not. The USB host driver refresh function is a function of initializing the USB host driver. In this embodiment, the USB host driver refresh function is selected by the user by pressing the aforementioned refresh button R on the operation panel 35 of the MFP 10. When the USB host driver refresh function has been selected (S11: YES), the process advances to step S12, otherwise (S11: NO) the process returns to the step S2. In cases where the operation panel 35 is not provided with the refresh button, it is possible to display a warning screen on the LCD 36 to prompt the user to specify whether to select the USB host driver refresh function or not by use of other keys on the operation panel 35. A time-out period may be employed when the user does not specify whether or not to select the USB host driver refresh function; the refresh function may be executed automatically when a prescribed time period has passed since the displaying of the warning screen.

In the step S12, the CPU 21 executes a USB host refresh process as a subroutine for refreshing the USB host driver. The details of the USB host refresh process will be described later. After the step S12 is finished, the process returns to step S2.

As explained above, the process (main routine) of FIG. 2 in regard to the USB host driver is executed repeatedly from the startup to the shutdown of the MFP 10.

Figure 3:
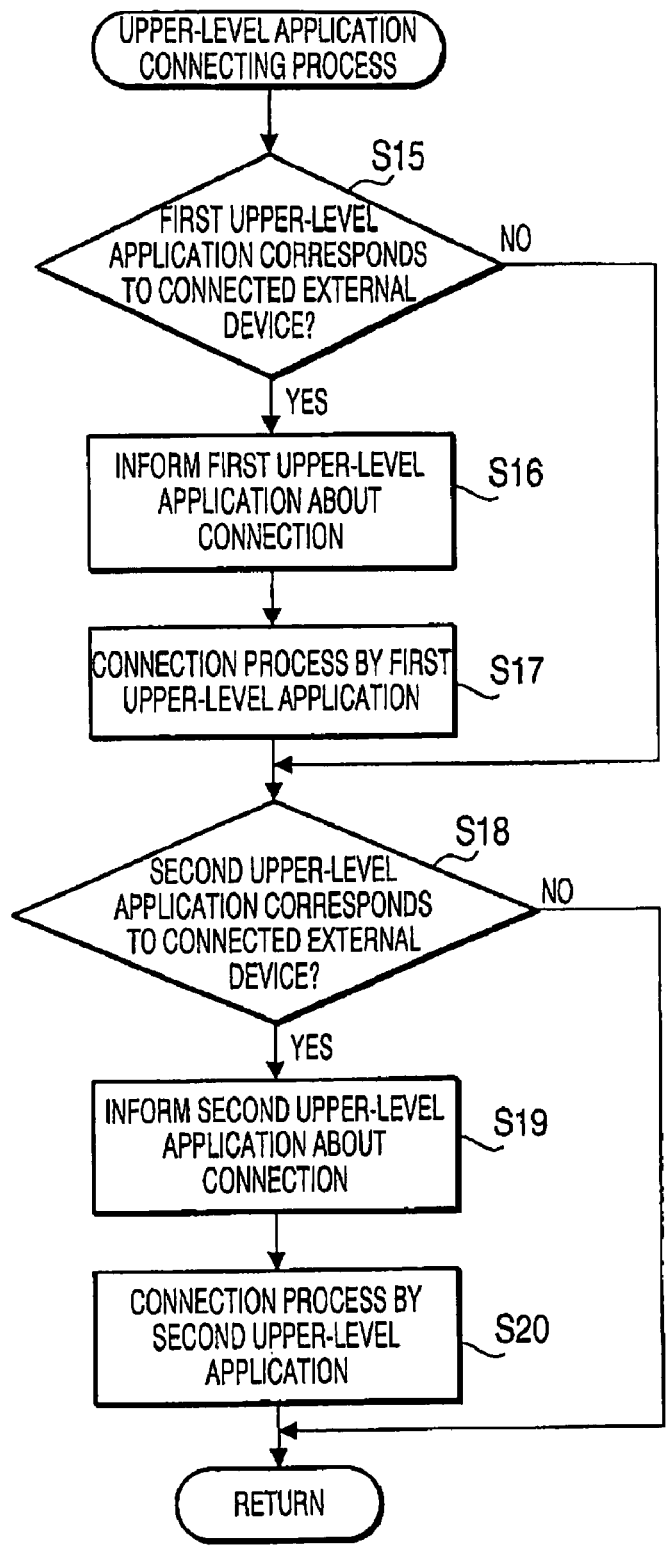
FIG. 3 is a flow chart showing an upper-level application connecting process executed by the MFP.

Next, the upper-level application connecting process (S4 in FIG. 2), as a subroutine for the connection to an upper-level application, will be explained in detail. FIG. 3 is a flow chart showing the upper-level application connecting process.

In the upper-level application connecting process, authentication of the connection to the application (upper-level application) corresponding to the external device (digital camera 41, wireless LAN module 42) actually connected to the USB terminal 38 is performed (based on the connection of the external device to the USB terminal 38 detected by the USB host driver) in order to make the connected external device available on the MFP 10. In this upper-level application connecting process (subroutine), the first upper-level application A1 or the second upper-level application A2 is informed by the USB host driver that a corresponding external device has been connected to the USB terminal 38.

In the step S115, the CPU 21 judges whether the application corresponding to the actually connected external device is the first upper-level application A1 or not. As mentioned above, the necessary application varies depending on which device is connected to the USB terminal 38. In this embodiment, the first and second upper-level applications A1 and A2 are assumed to be the applications necessary for the digital camera 41 and the wireless LAN module 42, respectively. When an external device is connected to the USB terminal 38, the upper-level application is selected based on the device class of the connected external device. For example, when the digital camera 41 corresponding to the first upper-level application A1 has been connected to the USB terminal 38 (S15: YES), the process advances to step S16. On the other hand, when the application corresponding to the actually connected external device is not the first upper-level application A1 (S15: NO), the process advances to step S118.

In the step S16, the USB host driver detecting that the digital camera 41 has been connected to the first USB terminal 38a informs the first upper-level application A1 about the connection. Thereafter, the process advances to the step S18.

In the step S17, a connection process that is necessary when the digital camera 41 is connected to the first USB terminal 38a is executed by the first upper-level application A1. For example, the first upper-level application A1 informs the digital camera 41 that the preparation for the PictBridge printing has been finished and instructs the digital camera 41 to make preparations for the printing, for example. Thereafter, the process advances to the step S18.

In the step S18, the CPU 21 (USB host driver) judges whether the upper-level application corresponding to the actually connected external device is the second upper-level application A2 or not. When the wireless LAN module 42 corresponding to the second upper-level application A2 has been connected to the USB terminal 38 (S18: YES), the process advances to step S19. On the other hand, when the application corresponding to the connected external device is not the second upper-level application A2 (S18: NO), the subroutine of FIG. 3 (upper-level application connecting process) is ended.

In the step S19, the USB host driver detecting that the wireless LAN module 42 has been connected to the second USB terminal 38b informs the second upper-level application A2 about the connection. Thereafter, the process advances to step S20.

In the step S20, a connection process that is necessary when the wireless LAN module 42 is connected to the second USB terminal 38b is executed by the second upper-level application A2. For example, the second upper-level application A2 sends a connection notification to the wireless LAN module 42. Thereafter, the subroutine of FIG. 3 (upper-level application connecting process) is ended.

As above, in the upper-level application connecting process, a corresponding application is selected based on the actually (physically) connected external device and a connection process necessary for the connected external device is executed by the selected application. Incidentally, while only two applications (first upper-level application A1, second upper-level application A2) have been described by way of example in this embodiment in order to explain the connection of the two external devices (digital camera 41, wireless LAN module 42), there exist a lot of other device classes of connectable devices. Therefore, it is necessary to make the selection of the corresponding application (from a lot of upper-level applications corresponding to a lot of device classes) based on the device class of the physically connected external device and to let the selected application execute the necessary connection process.

Figure 4:
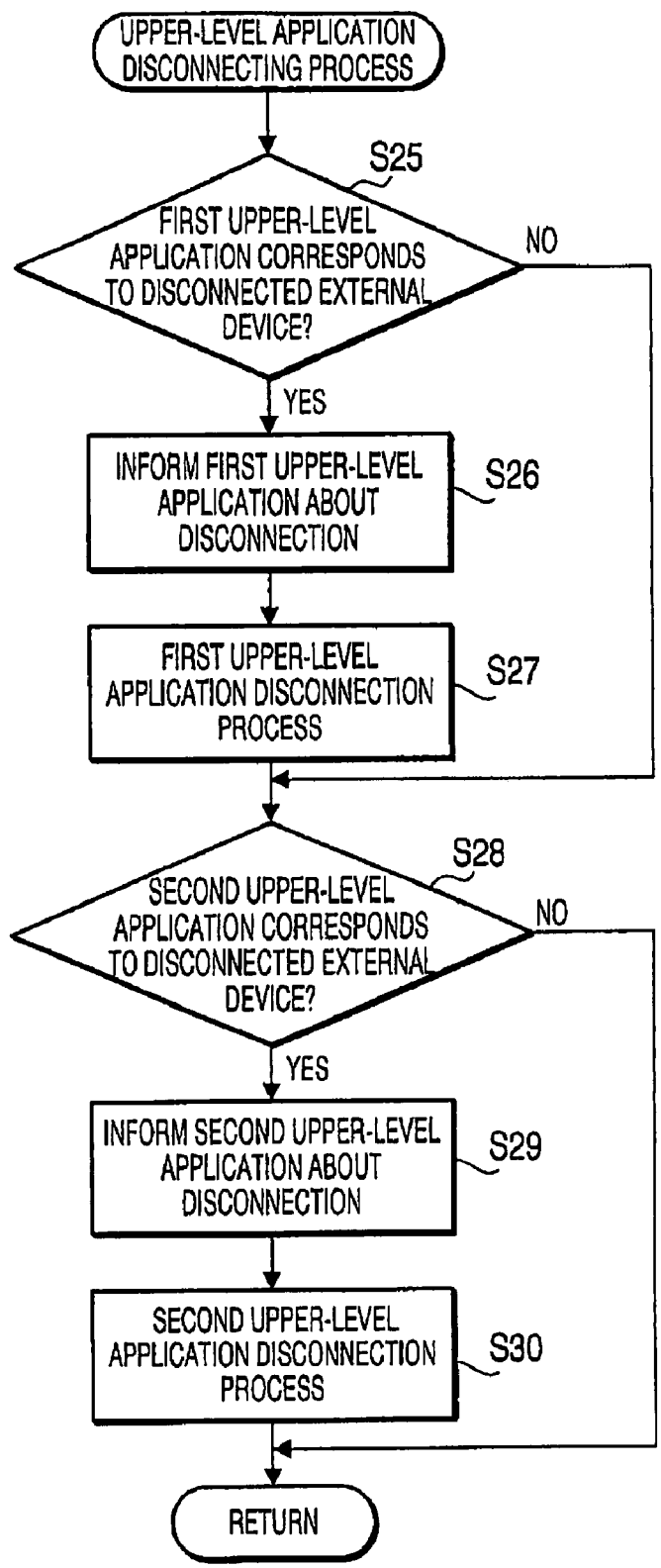
FIG. 4 is a flow chart showing an upper-level application disconnecting process executed by the MFP.

Next, the upper-level application disconnecting process (S9 in FIG. 2), as a subroutine for disconnecting the connection with an upper-level application, will be explained in detail. FIG. 4 is a flow chart showing the upper-level application disconnecting process.

In the upper-level application disconnecting process, the USB host driver, which has detected the physical disconnection (pulling out) of an external device (the digital camera 41 or the wireless LAN module 42) from the USB terminal 38 in the step S8 of FIG. 2, informs a corresponding application about the disconnection. The first upper-level application A1 or the second upper-level application A2 receiving the disconnection information exits from the connected state and returns to a connection standby state.

In the step S25, the CPU 21 judges whether the application corresponding to the (disconnected) external device is the first upper-level application A1 or not. When the digital camera 41 corresponding to the first upper-level application A1 is judged to have been disconnected (S25: YES), the process advances to step S26. On the other hand, when the application corresponding to the disconnected external device is not the first upper-level application A1 (S25: NO), the process advances to step S28.

In the step S26, the USB host driver informs the first upper-level application A1 that the digital camera 41 has been removed from the first USB terminal 38a. Thereafter, the process advances to step S27.

In the step S27, the first upper-level application A1, receiving the information that the connection with the digital camera 41 has been disconnected, shifts to the connection standby state.

In the step S28, the CPU 21 judges whether the application corresponding to the disconnected external device is the second upper-level application A2 or not. When the wireless LAN module 42 corresponding to the second upper-level application A2 has been disconnected (S28: YES), the process advances to step S29. On the other hand, when the application corresponding to the physically disconnected external device is not the second upper-level application A2 (S28: NO), the subroutine of FIG. 4 (upper-level application disconnecting process) is ended.

In the step S29, the USB host driver informs the second upper-level application A2 that the wireless LAN module 42 has been removed from the second USB terminal 38b. Thereafter, the process advances to step S30.

In the step S30, the second upper-level application A2, receiving the information that the connection with the wireless LAN module 42 has been disconnected, shifts to the connection standby state. Thereafter, the subroutine of FIG. 4 (upper-level application disconnecting process) is ended.

As above, in the upper-level application disconnecting process, a process specific to the disconnected external device is executed since the corresponding application varies depending on the device class of the external device (as the target of the process) similarly to the upper-level application connecting process of FIG. 3. Incidentally, when other upper-level applications (other than the first upper-level application A1 or the second upper-level application A2) are used, other processes corresponding to the upper-level application may be incorporated in the flow of FIG. 4 while not shown in this embodiment.

Figure 5:
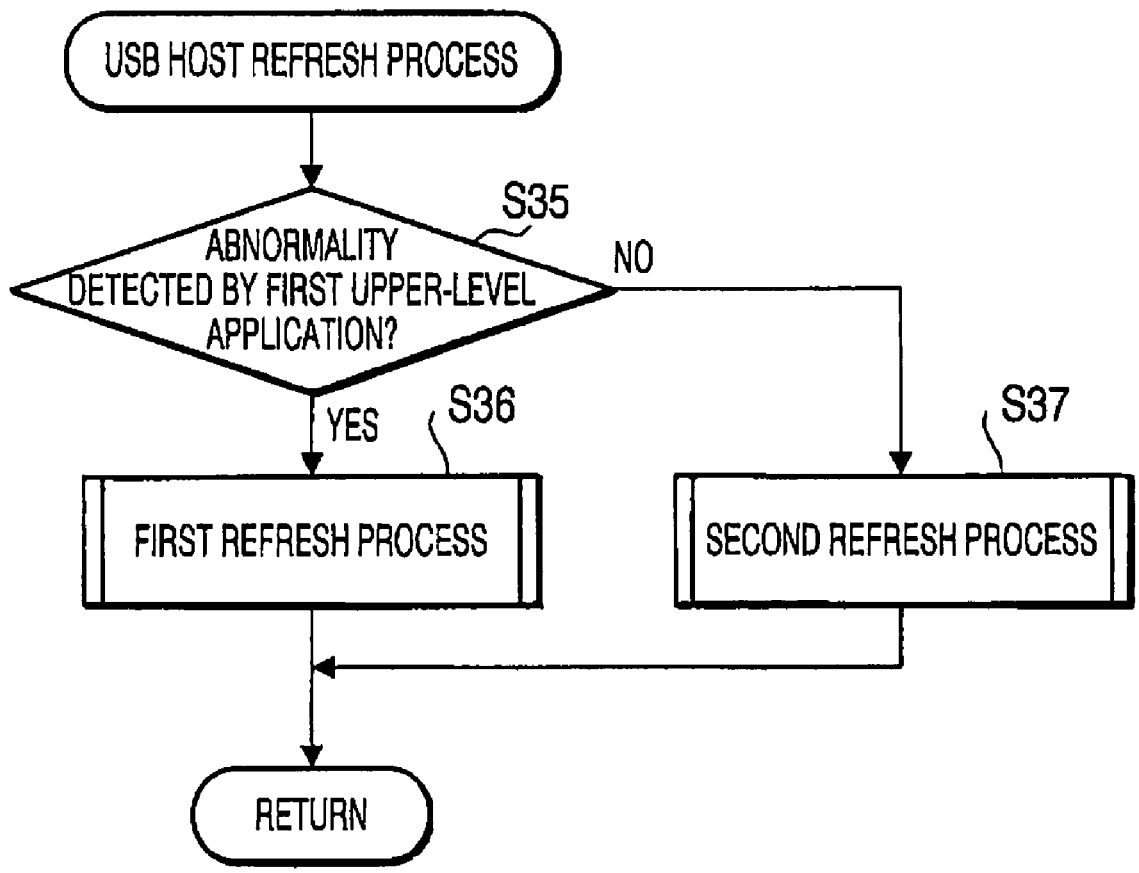
FIG. 5 is a flow chart showing a USB host refresh process executed by the MFP.

Next, the USB host refresh process (S12 in FIG. 2), as a subroutine for refreshing the USB host driver, will be explained in detail. FIG. 5 is a flow chart showing the USB host refresh process.

In the USB host refresh process, the application whose abnormality was detected in S7 is identified in order to execute a proper process corresponding to the application. In the case where abnormality has been detected in S7 (S7: YES) and the refresh function has been selected in S11 (S111: YES), the necessary process varies depending on whether the application is the first upper-level application A1 or the second upper-level application A2, and thus it is necessary to judge which external device (the digital camera 41 or the wireless LAN module 42) is having the connection problem.

In the step S35, the CPU 21 judges whether the abnormality was detected by the first upper-level application A1 or not. When the abnormality was detected by the first upper-level application A1 (S35: YES), the process advances to step S36, otherwise (S35: NO) the process advances to step S37.

The abnormality detected can include communication failure disabling the communication between the MFP 10 and an external device, such as a case where a timeout occurs without any response from the digital camera 41 since the transmission of a data transmission request from the first upper-level application A1 to the digital camera 41. Since the communication control is actually executed by the USB host driver, the current connection status has been reported from the USB host driver to the first upper-level application A1, by which the first upper-level application A1 has recognized the current connection status with the digital camera 41 (e.g. the occurrence of the abnormality).

In the step S36, the CPU 21 executes a first refresh process as a first subroutine of the USB host refresh process. Thereafter, the USB host refresh process of FIG. 5 is ended.

In the step S37, the CPU 21 executes a second refresh process as a second subroutine of the USB host refresh process. Thereafter, the USB host refresh process of FIG. 5 is ended.

Since only two applications (first upper-level application A1, second upper-level application A2) are used in this embodiment, one of the two refresh processes (the first refresh process or the second refresh process) is selectively executed depending on the application (the first upper-level application A1 or the second upper-level application A2) detecting the abnormality.

The USB host refresh process is executed differently for the first upper-level application A1 and the second upper-level application A2 as above since the necessary end processing differs between the digital camera 41 and the wireless LAN module 42 connected to the MFP 10. This point will be explained below.

Incidentally, when other upper-level applications (other than the first upper-level application A1 or the second upper-level application A2) are operating on the MFP 10, other processes corresponding to the upper-level applications may be incorporated in the flow of FIG. 5 while not shown in this embodiment.

Figure 6:
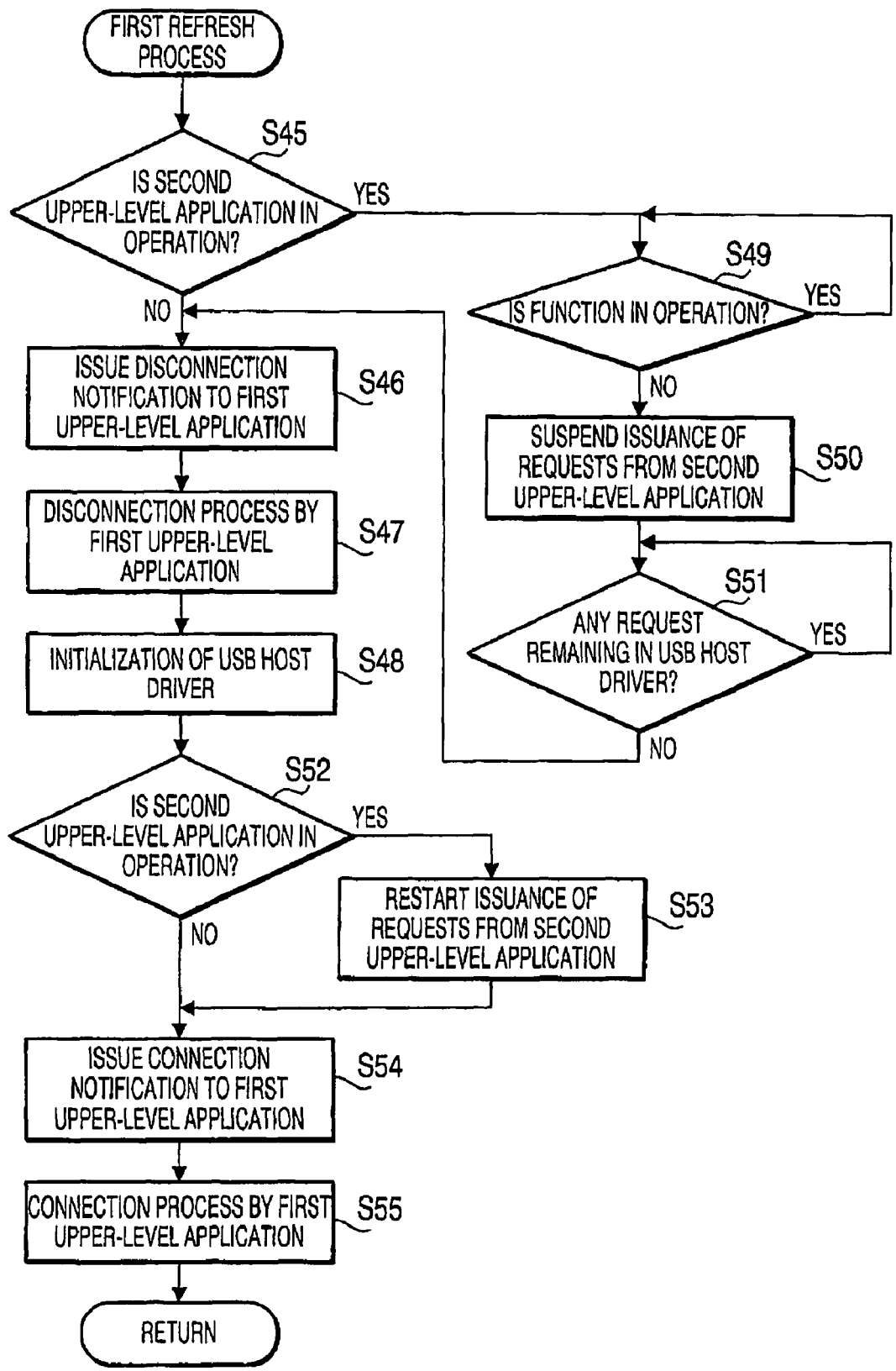
FIG. 6 is a flow chart showing a first refresh process executed by the MFP.

Next, the first refresh process (S36 in FIG. 5), as the first subroutine of the USB host refresh process of FIG. 5, will be explained in detail. FIG. 6 is a flow chart showing the first refresh process.

The first refresh process is the subroutine executed in the state in which the communication failure has occurred to the communication with the digital camera 41 corresponding to the first upper-level application A1, in which the wireless LAN module 42 corresponding to the second upper-level application A2 is generally operating normally. In this state, a process for initializing the USB host driver is executed.

In the step S45, the CPU 21 checks whether the second upper-level application A2 is in operation or not. When the second upper-level application A2 is in operation (S45: YES), the process advances to step S49, otherwise (S45: NO) the process advances to step S46.

The above condition "the second upper-level application A2 is in operation" means that the second upper-level application A2 currently recognizes that the wireless LAN module 42 is connected to the second USB terminal 38b and stays in the connected state. When the wireless LAN module 42 is not physically connected to the second USB terminal 38b, the second upper-level application A2 stays in the connection standby state.

In the step S46, the CPU 21 issues a disconnection notification to the first upper-level application A1. While the USB host driver in the step S26 of FIG. 4 informs the first upper-level application A1 that the digital camera 41 has been removed (physically disconnected) from the first USB terminal 38a, the disconnection notification in this step S46 is issued to the first upper-level application A1 in the state in which the digital camera 41 is physically connected to the first USB terminal 38a, in order to execute the initialization of the USB host driver. Thereafter, the process advances to step S47.

In the step S47, a disconnection process that is necessary when the connection with the digital camera 41 is disconnected is executed by the first upper-level application A1. Thereafter, the process advances to step S48.

In the step S48, the CPU 21 initializes the USB host driver. By the initialization of the USB host driver, the abnormality detected in the step S7 can be eliminated. In other words, an initialization process identical with the step S1 of FIG. 2 is executed in this step S48 in order to reacquire the connection with the external devices (digital camera 41, wireless LAN module 42) physically connected to the USB terminal 38. Thereafter, the process advances to step S52.

Meanwhile, in the step S49, the CPU 21 judges whether a function of the second upper-level application A2 is in operation or not. In this step, whether each command of the second upper-level application A2 is operating or not is checked differently from the step S45. For example, when the user of the PC 50 hopes to print out data by use of the MFP 10, a print instruction (with print data) is transmitted from the PC-side wireless LAN module 51 to the wireless LAN module 42, and the second upper-level application A2 makes the MFP 10 execute the printing according to the print instruction (with print data) received via the wireless LAN module 42. When a command of the second upper-level application A2 is operating as above (S49: YES), the CPU 21 waits until the operation of the command finishes. On the other hand, when no function of the second upper-level application A2 is in operation (S49: NO), the process advances to step S50.

In the step S50, the CPU 21 (USB host driver) stops (suspends) the issuance of requests from the second upper-level application A2. Thereafter, the process advances to step S51.

Since the connection (connected state) with external devices generally has to be interrupted for the initialization of the USB host driver as mentioned above, it is basically necessary to give the second upper-level application A2 information (notification) that the connection between the second USB terminal 38b and the wireless LAN module 42 has been disconnected. However, in this step S50, an instruction for stopping requests is issued to the second upper-level application A2 without issuing the disconnection notification thereto, by which the second upper-level application A2 is prohibited from issuing instructions (requests) to the USB host driver. Thus, the second upper-level application A2 remains in the connected state, without executing the disconnection process for the wireless LAN module 42.

In the step S51, the CPU 21 judges whether or not there remains a request in the USB host driver. While the USB host driver requests the second upper-level application A2 to suspend (temporarily stop) the issuance of requests to the wireless LAN module 42 via the USB host driver, the CPU 21 waits in this step S51 (S51: YES) until the request is satisfied. When the request is satisfied and there remains no request in the USB host driver (S51: NO), the process advances to the aforementioned step S46.

In the step S52 which is executed after the initialization of the USB host driver (S48), the CPU 21 judges whether the second upper-level application A2 is in operation or not. The second upper-level application A2 is not in operation (S52: NO) when the process directly advanced from S45 to S46. On the other hand, the second upper-level application A2 is in operation (S52: YES) and stays in the suspended state (in which the issuance of requests is suspended) when the process advanced from S45 to S49. Thus, the judgment of S52 is made in order to determine the current state of the second upper-level application A2 (e.g. whether the second upper-level application A2 is in the suspended state or not). When the second upper-level application A2 is in operation (S52: YES), the process advances to step S53, otherwise (S52: NO) the process advances to step S54.

In the step S53, the CPU 21 restarts the issuance of requests from the second upper-level application A2. Since the issuance of requests from the second upper-level application A2 has been suspended in the step S50, the issuance of requests (from the second upper-level application A2 to the wireless LAN module 42 via the USB host driver) is restarted after the disconnection of the connection with the digital camera 41 regarding the communication failure (S47) and the initialization of the USB host driver (S48) have been finished, by which the processing by the second upper-level application A2 (which has been suspended in S50) is allowed to restart. Thereafter, the process advances to step S54.

In the step S54, the CPU 21 issues a connection notification to the first upper-level application A1. While the first upper-level application A1 controlling the digital camera 41 has disconnected the connection between the first USB terminal 38a and the digital camera 41 in S47 for the initialization of the USB host driver, the first upper-level application A1 receiving the connection notification after the initialization of the USB host driver reconnects the connection between the first USB terminal 38a and the digital camera 41 (S55). Thereafter, the first refresh process of FIG. 6 is ended.

Figure 7:
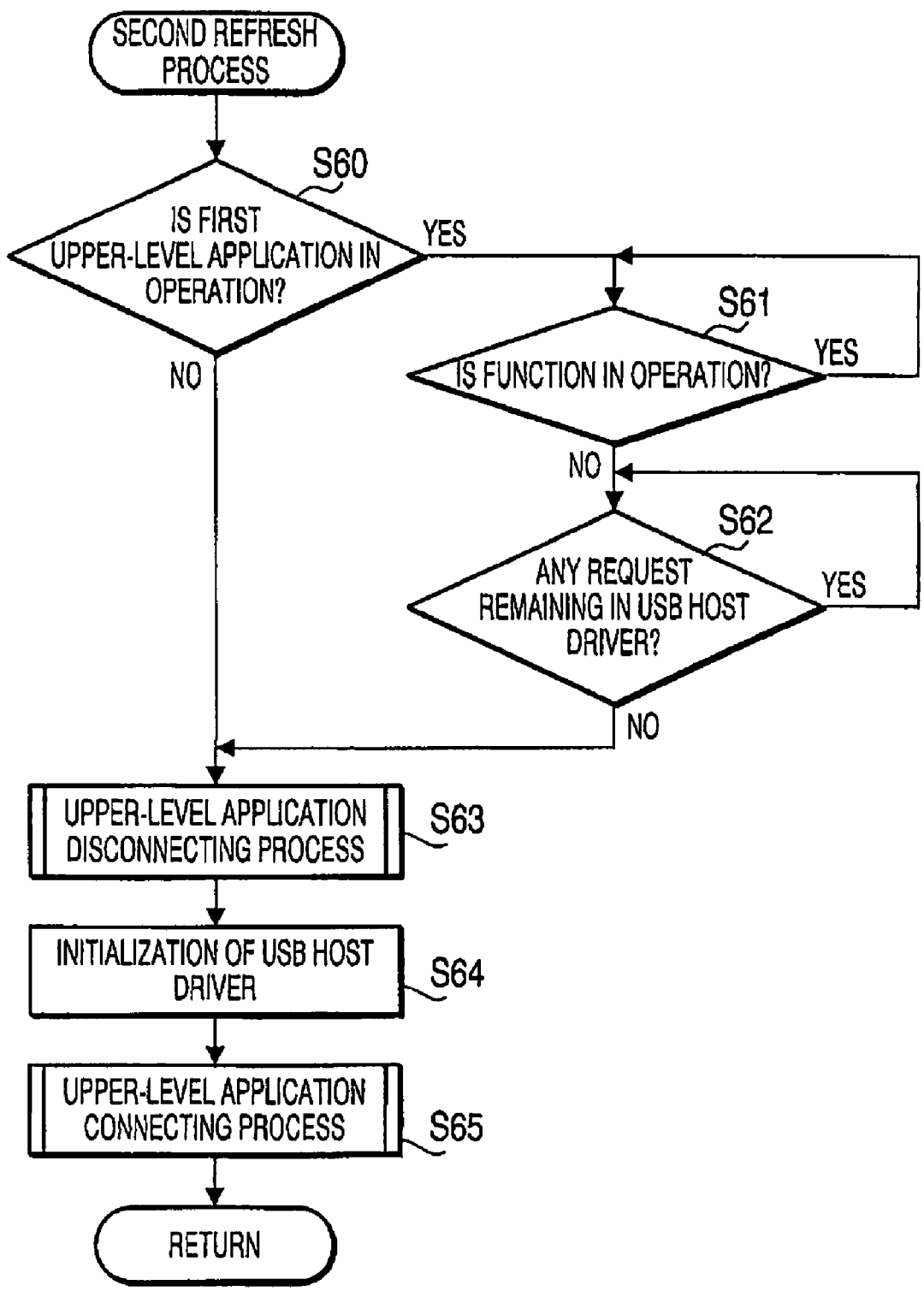
FIG. 7 is a flow chart showing a second refresh process executed by the MFP.

Next, the second refresh process (S37 in FIG. 5), as the second subroutine of the USB host refresh process of FIG. 5, will be explained in detail. FIG. 7 is a flow chart showing the second refresh process.

In the step S60, the CPU 21 checks whether the first upper-level application A1 is in operation or not. When the first upper-level application A1 is in operation (S60: YES), the process advances to step S61, otherwise (S60: NO) the process advances to step S63. The above condition "the first upper-level application A1 is in operation" is defined similarly to the condition regarding the second upper-level application A2 employed in the step S45. Specifically, the condition "the first upper-level application A1 is in operation"

means that the digital camera 41 is connected to the first USB terminal 38a and the first upper-level application A1 is in the connected state, and the opposite condition "the first upper-level application A1 is not in operation" means that the first upper-level application A1 is in the connection standby state.

In the step S61, the CPU 21 judges whether a function of the first upper-level application A1 is in operation or not. In this step, whether the first upper-level application A1 is operating to execute the PictBridge printing in response to an instruction from the digital camera 41 or not is checked differently from the step S60. When a function of the first upper-level application A1 is in operation (S61: YES), the CPU 21 waits until the operation of the function (PictBridge printing) finishes. On the other hand, when no function of the first upper-level application A1 is in operation (S61: NO), the process advances to step S62.

In the step S62, the CPU 21 judges whether or not there remains a request in the USB host driver. If there remains the request, the CPU 21 (USB host driver) waits in this step S62 (S62: YES) until the request dissolves (i.e., no request remains). When the request dissolves, that is, there remains no request in the USB host driver (S62: NO), the process advances to the step S63.

In the step S63, the CPU 21 executes an upper-level application disconnecting process similar to the upper-level application disconnecting process of FIG. 4. Thereafter, the process advances to step S64.

In the step S64, the CPU 21 initializes the USB host driver. Thereafter, the process advances to step S65.

In the step S65, the CPU 21 executes an upper-level application connecting process similar to the upper-level application connecting process of FIG. 3. Thereafter, the second refresh process of FIG. 7 is ended.

It should be noted that, the upper-level application disconnecting process executed in the step S63 and the upper-level application connecting process executed in the step S65 operate in different ways depending on whether the camera 41 is connected to the first USB terminal 38a or not. If the camera 40 is connected (S60: YES), the CPU 21 judges that the application is the first upper-level application A1 (S25: YES) in the upper-level application disconnecting process which is executed in S63. The CPU 21 also makes affirmative judgment at the step S28 after execution of the steps S26 and 27, and the steps S29 and S30 are executed. Similarly, in the upper-level connecting process at S65, the CPU 21 makes affirmative judgment in S15 and S18, and all the processes are executed. On the other hand, if the camera 41 is not connected (S60: NO), the CPU 21 makes negative judgment in SI5 of the upper-level disconnecting process at S65, then affirmative judgment in S18. Further, the CPU 21 makes negative judgment in S25 and affirmative judgment in S28 of the upper-application connecting process at S65. The above judgments are made since the first upper-level application A1 has not been executed if the camera 41 is not connected.

With the operation of the MFP 10 of this embodiment described above, the following effects are achieved.

The initialization of the USB host driver becomes necessary when abnormality has occurred to the connection status with one of the external devices (digital camera 41, wireless LAN module 42) connected to the USB terminals 38 of the MFP 10.

Since the connection between the wireless LAN module 42 and the PC-side wireless LAN module 51 has to be made from the PC 50 side, the reconfiguration has to be performed by the PC 50 in order to reconnect the connection that has once disconnected. Thus, the wireless LAN module 42 stays unusable until the connection status recovers to the normal state, and the printing from the PC 50 by use of the MFP 10 can not be carried out for a while.

However, by the execution of the first refresh process of FIG. 6 when abnormality has occurred to the connection with the digital camera 41 only (with normal connection maintained with the wireless LAN module 42), the second upper-level application A2 shifts to the suspended state while maintaining the connection with the wireless LAN module 42 (the wireless LAN module 42 shifts to the suspended state while maintaining the communication (connection) with the PC-side wireless LAN module 51). Since the recovery of the normal connection state is unnecessary, the printing from the PC 50 by use of the MFP 10 can be restarted immediately after the refresh operation.

Even though the initialization of the USB host driver itself does not take a long time, once the wireless LAN module 42 is initialized, the initialization and the recovery of the communication with the PC-side wireless LAN module 51 connected to the PC 50 takes a long time.

In the case where the digital camera 41 is connected to the first USB terminal 38a and unilaterally transmits data to the MFP 10 in response to an instruction from the first upper-level application A1, it does not take a long time for the recovery of normal communication even if the connected state with the digital camera 41 is once canceled for the initialization of the USB host driver. However, in the case of the wireless LAN module 42 executing bidirectional communication with the PC-side wireless LAN module 51 to maintain the normal communication state, it takes a while for the recovery of the normal communication if the connected state with the wireless LAN module 42 is once canceled for the initialization of the USB host driver.

Since such a waiting time (caused by the stoppage of a function that can still be used normally) is stressful to the user, comfortable use of the MFP 10 becomes possible if the MFP 10 can be used without such waiting times.

By executing a different process depending on the upper-level application as above (e.g. by executing the "first refresh process" when abnormality has occurred to the communication with the digital camera 41 corresponding to the first upper-level application A1, while executing the "second refresh process" when abnormality has occurred to the communication with the wireless LAN module 42 corresponding to the second upper-level application A2), the initialization of the USB host driver can be executed optimally and quick recovery from the abnormal state becomes possible.

Further, while the initialization of the USB host driver requires the cancellation of the connected state of the USB terminal 38 with the digital camera 41 and the wireless LAN module 42 and the transition of the first upper-level application A1 and the second upper-level application A2 to the connection standby state, no command is interrupted in this embodiment since each refresh process (first refresh process, second refresh process) is configured to wait for the completion of execution of commands (S49 in FIG. 6, S61 in FIG. 7). For example, when the PC 50 has instructed the MFP 10 to execute the printing of data, the interruption of commands causes waste of print data (which have partly been printed on the print medium). The MFP 10 of this embodiment avoids such wastes by waiting for the completion of execution of commands as above.

The wireless LAN module 42 and the PC-side wireless LAN module 51 communicate data with each other by packet communication. If commands are interrupted when the refresh button R of the MFP 10 is pressed by the user requesting the initialization of the USB host driver, packet data from the PC-side wireless LAN module 51 can be lost even when the packet data are normally received by the wireless LAN module 42. The MFP 10 of this embodiment (configured not to interrupt commands) is capable of preventing such loss of packet data.

As above, even when the initialization of the USB host driver is necessary when abnormality has occurred to the communication with the digital camera 41 corresponding to the first upper-level application A1, the initialization can be carried out with substantially no ill effects on the processing by the wireless LAN module 42 corresponding to the second upper-level application A2.

The configuration, operation and effects of the MFP 10 in the above embodiment can be characterized as below. The MFP 10, as an information processing device equipped with multiple USB terminals 38 (interfaces of the same type) which can be connected with external devices (digital camera 41, wireless LAN module 42), comprises: the USB host driver (stored in the ROM 22) capable of controlling the multiple USB terminals 38 in parallel; the first upper-level application A1 and the second upper-level application A2 which issue instructions regarding the control of the USB terminals 38 to the USB host driver; the CPU 21 which executes various processes for controlling the MFP 10 (such as the initialization of the USB host driver in S1, S48 and S64); and the refresh button R of the operation panel 35 through which an initialization instruction for the initialization of the USB host driver is inputted. The control of a USB terminal 38 (e.g. second USB terminal 38b) executed by the USB host driver is detected by the CPU 21 in the step S3, for example. An end of the control of a USB terminal 38 (e.g. second USB terminal 38b) by the USB host driver (which is executed according to the instructions regarding the control issued by the second upper-level application A2, for example) is detected by the CPU 21 on condition that the control of the USB terminal 38 (e.g. second USB terminal 38b) by the USB host driver has been detected (e.g. S49-S51). Abnormality regarding the control of a USB terminal 38 (e.g. first USB terminal 38a) by the USB host driver is detected by the CPU 21 in the step S7. In the steps S35-S37, the initialization of the USB host driver is executed by the CPU 21 on condition that the abnormality regarding the control of an interface (e.g. first USB terminal 38a) by the USB host driver has been detected in the step S7, the initialization instruction has been inputted through the refresh button R, and the end of the control of at least one of the other interfaces (e.g. second USB terminal 38b) by the USB host driver has been detected.

In the MFP 10 configured and operating as above, the initialization of the USB host driver (capable of controlling the multiple USB terminals 38 in parallel) can be carried out with substantially no ill effects on the processing between the MFP 10 and the wireless LAN module 42 which is connected to the MFP 10 via the second USB terminal 38b.

Further, since continuation of the abnormal state of the USB host driver can be avoided properly, the processing efficiency of the MFP 10 can be increased.

In the step S50, the CPU 21 requests the second upper-level application A2 to suspend the issuance of the instructions to the USB host driver on condition that the abnormality (regarding the control of an interface (e.g. first USB terminal 38a) by the USB host driver) has been detected. With this configuration, quick recovery of the USB host driver from the abnormal state is possible. Therefore, the control by the USB host driver in the normal state can be regained quickly in cases where the restart of the control by the USB host driver is necessary.

The method for initializing the USB host driver employed in the above embodiment comprises the steps of: detecting control of an interface (e.g. second USB terminal 38b) executed by the USB host driver capable of controlling the multiple interfaces in parallel (e.g. S3); detecting an end of the control of an interface (e.g. second USB terminal 38b) by the USB host driver (which is executed according to instructions regarding the control of the interfaces issued by the second upper-level application A2, for example) on condition that the control of the interface (e.g. second USB terminal 38b) by the USB host driver has been detected (e.g. S49-S51); detecting abnormality regarding the control of an interface (e.g. first USB terminal 38a) by the USB host driver; allowing a user to input an initialization instruction for initialization of the USB host driver (S11); and executing the initialization of the USB host driver on condition that the abnormality regarding the control of an interface (e.g. first USB terminal 38a) by the USB host driver has been detected, the initialization instruction has been inputted, and the end of the control of at least one of the other interfaces (e.g. second USB terminal 38b) by the USB host driver has been detected.

With the interface controller initializing method configured as above, effects similar to those of the information processing device described above can be achieved.

The same effects can be achieved also by distributing a computer-readable record medium (CD-ROM, DVD-ROM, floppy disk, flash memory, EEPROM, etc.), storing computer-readable instructions that cause a computer to execute the above steps, to an information processing device and letting the computer of the information processing device load the instructions from the record medium and execute the instructions.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the flow charts of FIGS. 2-7 (main routine, subroutines) explained in the above embodiment are just an example of a process executed by the information processing device; modification of the flow (adding new steps, changing the order of steps, etc.) depending on the specifications of the device (program) is possible.

While the MFP 10 in the above embodiment is equipped with two USB terminals 38, the number of the USB terminals 38 can also be one, or three or more. When the MFP 10 has only one USB terminal 38, the USB terminal 38 may be separated into multiple USB terminals by use of a hub device functioning as nodes.

While the MFP 10 has been described in the above embodiment as an example of an information processing device, the present invention is applicable to any information processing device (e.g. personal computer) that is equipped with multiple interfaces of the same type which can be connected with external devices.

While the MFP 10 in the above embodiment includes the scanner unit 32, the NCU 33 and the modem 34 in addition to the printer unit 31 so as to implement the FAX function, the components and the functions of the MFP 10 (information processing device) may arbitrarily be increased/decreased or modified as needed.

What is claimed is:

1. An information processing device equipped with multiple interfaces of the same type which can be connected with external devices, comprising:
a first control unit capable of controlling the multiple interfaces in parallel;
a second control unit which issues instructions regarding control of the interfaces to the first control unit;
an execution detecting unit which detects the control of an interface executed by the first control unit;
an end detecting unit which detects an end of the control of an interface by the first control unit executed according to the instructions regarding the control issued by the second control unit, on condition that the control of the interface by the first control unit has been detected by the execution detecting unit;
an abnormality detecting unit which detects abnormality regarding the control of an interface by the first control unit;
an initialization unit which executes initialization of the first control unit;
an input unit through which an initialization instruction for the initialization of the first control unit is inputted; and
an initialization control unit which executes the initialization of the first control unit by use of the initialization unit on condition that the abnormality regarding the control of an interface by the first control unit has been detected by the abnormality detecting unit, the initialization instruction has been inputted through the input unit, and the end of the control of at least one of the other interfaces by the first control unit has been detected by the end detecting unit.

2. The information processing device according to claim 1, further comprising an instruction suspending unit which requests the second control unit to suspend the issuance of the instructions to the first control unit on condition that the abnormality has been detected by the abnormality detecting unit.

3. The information processing device according to claim 1, wherein the initialization control unit defers the initialization of the first control unit until the ends of the control of all of the other interfaces by the first control unit are detected by the end detecting unit.

4. The information processing device according to claim 1, wherein the initialization control unit defers the initialization of the first control unit until the end of the control of an interface connected with an external device of a prescribed type is detected by the end detecting unit.

5. The information processing device according to claim 1, wherein the information processing device is equipped with USB terminals as the multiple interfaces of the same type and a USB host driver as the first control unit.

6. A computer-readable record medium storing computer-readable instructions that cause a computer, which controls an information processing device equipped with multiple interfaces of the same type which can be connected with external devices, to execute:
an execution detecting step of detecting control of an interface executed by a first control unit capable of controlling the multiple interfaces in parallel;
an end detecting step of detecting an end of the control of an interface by the first control unit executed according to instructions regarding the control of the interfaces issued by a second control unit, on condition that the control of the interface by the first control unit has been detected by the execution detecting step;
an abnormality detecting step of detecting abnormality regarding the control of an interface by the first control unit;
an input step of allowing a user to input an initialization instruction for initialization of the first control unit; and
an initialization control step of executing the initialization of the first control unit on condition that the abnormality regarding the control of an interface by the first control unit has been detected by the abnormality detecting step, the initialization instruction has been inputted in the input step, and the end of the control of at least one of the other interfaces by the first control unit has been detected by the end detecting step.

7. The computer-readable record medium according to claim 6, further storing computer-readable instructions that cause the computer to execute an instruction suspending step of requesting the second control unit to suspend the issuance of the instructions to the first control unit on condition that the abnormality has been detected by the abnormality detecting step.

8. The computer-readable record medium according to claim 6, wherein the initialization control step defers the initialization of the first control unit until the ends of the control of all of the other interfaces by the first control unit are detected by the end detecting unit.

9. The computer-readable record medium according to claim 6, wherein the initialization control step defers the initialization of the first control unit until the end of the control of an interface connected with an external device of a prescribed type is detected by the end detecting unit.

10. An interface controller initializing method for an information processing device equipped with multiple interfaces of the same type which can be connected with external devices, comprising:
an execution detecting step of detecting control of an interface executed by a first control unit capable of controlling the multiple interfaces in parallel;
an end detecting step of detecting an end of the control of an interface by the first control unit executed according to instructions regarding the control of the interfaces issued by a second control unit, on condition that the control of the interface by the first control unit has been detected by the execution detecting step;
an abnormality detecting step of detecting abnormality regarding the control of an interface by the first control unit;
an input step of allowing a user to input an initialization instruction for initialization of the first control unit; and
an initialization control step of executing the initialization of the first control unit on condition that the abnormality regarding the control of an interface by the first control unit has been detected by the abnormality detecting step, the initialization instruction has been inputted in the input step, and the end of the control of at least one of the other interfaces by the first control unit has been detected by the end detecting step.

11. The interface controller initializing method according to claim 10, further comprising an instruction suspending step of requesting the second control unit to suspend the issuance of the instructions to the first control unit on condition that the abnormality has been detected by the abnormality detecting step.

12. The interface controller initializing method according to claim 10, wherein the initialization control step defers the initialization of the first control unit until the ends of the control of all of the other interfaces by the first control unit are detected by the end detecting unit.

13. The interface controller initializing method according to claim 10, wherein the initialization control step defers the initialization of the first control unit until the end of the control of an interface connected with an external device of a prescribed type is detected by the end detecting unit.

* * * * *